(12) United States Patent
Todorovic

(10) Patent No.: US 9,963,987 B2
(45) Date of Patent: May 8, 2018

(54) FULLY INTEGRATED AIR GUIDE ELEMENT

(71) Applicant: Rolls-Royce Deutschland Ltd & Co KG, Blankenfelde-Mahlow (DE)

(72) Inventor: Predrag Todorovic, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 197 days.

(21) Appl. No.: 14/943,865

(22) Filed: Nov. 17, 2015

(65) Prior Publication Data

US 2016/0138411 A1 May 19, 2016

(30) Foreign Application Priority Data

Nov. 18, 2014 (DE) .......................... 10 2014 223 548

(51) Int. Cl.
| | |
|---|---|
| *F01D 9/06* | (2006.01) |
| *F01D 25/24* | (2006.01) |
| *F02K 3/075* | (2006.01) |
| *F02C 9/18* | (2006.01) |

(52) U.S. Cl.
CPC ............. *F01D 9/065* (2013.01); *F01D 25/24* (2013.01); *F02C 9/18* (2013.01); *F02K 3/075* (2013.01); *F05D 2220/323* (2013.01); *F05D 2230/644* (2013.01); *F05D 2240/12* (2013.01); *F05D 2240/55* (2013.01); *F05D 2250/51* (2013.01); *Y02T 50/672* (2013.01)

(58) Field of Classification Search
CPC ......... B64D 29/00; B64D 33/02; F01D 9/065; F01D 9/06; F02C 9/18; F02K 3/075
See application file for complete search history.

(56) References Cited

U.S. PATENT DOCUMENTS

| | | | |
|---|---|---|---|
| 3,591,963 | A | 7/1971 | Kopp |
| 3,646,980 | A | 3/1972 | Peterson et al. |
| 5,351,732 | A | 10/1994 | Mills et al. |
| 5,706,648 | A | 1/1998 | Porte et al. |
| 8,408,008 | B2 | 4/2013 | Todorovic et al. |
| 2006/0197287 | A1 | 9/2006 | Farah et al. |
| 2013/0266448 | A1 | 10/2013 | Blin et al. |

FOREIGN PATENT DOCUMENTS

| | | |
|---|---|---|
| DE | 1751550 U | 8/1957 |
| DE | 1751550 A1 | 12/1970 |
| DE | 69606070 T2 | 8/2000 |
| DE | 102009011635 A1 | 9/2010 |
| GB | 760513 A | 10/1956 |

OTHER PUBLICATIONS

European Search Report dated Apr. 20, 2016 from counterpart European App No. 15195030.0.
German Search Report dated Sep. 17, 2015 for related German patent application No. 10 2014 223 548.0.

*Primary Examiner* — Woody Lee, Jr.
*Assistant Examiner* — Maxime Adjagbe
(74) *Attorney, Agent, or Firm* — Shuttleworth & Ingersoll, PLC; Timothy J. Klima

(57) ABSTRACT

An air guide element of an aircraft gas turbine, including an external housing that is provided with an inflow opening, as well as with a flow channel that is arranged inside the housing, characterized in that a tubular intermediate element that is made of an elastic material is arranged inside the inflow opening, connecting the inflow opening to the flow channel in a sealing and position-adjusting manner.

16 Claims, 5 Drawing Sheets

FULLY INTEGRATED AIR GUIDE ELEMENT

This application claims priority to German Patent Application 102014223548.0 filed Nov. 18, 2014, the entirety of which is incorporated by reference herein.

The invention relates to a fully integrated air guide element of an aircraft gas turbine.

In particular, the invention relates to an air guide element of an aircraft gas turbine with an external housing that is provided with an inflow opening, as well as a flow channel that is arranged inside the housing. Such air guide elements are used, for example, to extract air from a channel through which a flow is passing, for example the bypass channel, in order to use this air for other purposes, for example for sealing.

Such an air guide element is already known from DE 10 2009 011 635 A1.

The constructions that are known from the state of the art have the disadvantage that they comprise a large number of individual structural components, and that manufacturing and mounting require extensive effort. This is due to the wide diversity of seals, support elements, reinforcing elements, and the like. Here, in particular the disadvantage arises that the previous constructions are laborious with respect to the allocation of the individual structural components, in particular if these are deformed or change their positions as a result of thermal influences or vibrations. In order to compensate for these effects, large tolerances are necessary, which in turn lead to sealing problems. Another disadvantage is the high cost for the manufacture and mounting as well as the substantial weight of the entire arrangement.

The invention is based on the objective to create an air guide element of the kind as it has been mentioned in the beginning, in which the disadvantages of the state of the art are avoided and which is easy to mount, while at the same time allowing for a simple design and an easy, cost-effective manufacturability.

The objective is solved by a combination of features disclosed herein with the present disclosure showing further advantageous embodiments.

Thus, it is provided according to the invention that a tubular intermediate element made of an elastic material is arranged inside the inflow opening.

According to the invention, the intermediate element connects in a sealing and position-adjusting manner the area of the inflow opening of the external housing to the flow channel that is arranged in a tubular manner at the external housing. Through the elastic intermediate element according to the invention, it is in particular possible to combine different functionalities in one structural component, namely the sealing function as well as the alignment and adjustment of the other structural elements, in particular of the housing and of the flow channel. Through the intermediate element according to the invention, the inflowing air is thus guided into the flow channel reliably and without flow loss. Relative movements between the external housing and the flow channel can be compensated for through the elastic intermediate element. Thus, the intermediate element forms a flow tube in order to guide the air that is flowing through the inlet opening of the stationary external housing into the tubular flow channel, wherein the flow channel can perform relative movements relative to the external housing. Thanks to the elasticity of the intermediate element, a tight connection between the inflow opening of the external housing and the flow channel is ensured at all times.

A sufficient stiffness and shape retention is achieved through a suitable selection of the material (stiffness of the rubber compound) as well as of the wall thicknesses of the elastic intermediate element. Further, it is possible to form suitable seals at the intermediate element in order to seal off the transition between the intermediate element and the external housing, as well as to connect the flow channel in a sealing manner to the intermediate element by forming an integrated seal.

According to the invention, the elastic intermediate element can be manufactured from rubber or a rubber-like material, for example. It can be moulded and vulcanized in a particularly simple manner.

It is particularly advantageous if the intermediate element is provided with a ring-shaped sealing bead at its front area as seen in the flow direction. For one thing, this sealing bead provides the inflow area of the intermediate element with sufficient stability, for another it is possible to insert the intermediate element into the inflow area (inflow opening) of the external housing in a permanent and sealing manner. According to the invention, the sealing bead can be fixedly connected here to the front edge area of the external housing, for example through gluing or the like.

A ring-shaped seal that is abutting against the flow channel is preferably arranged at the back end area of the intermediate element. Here, the flow channel can be widened or provided with a beading at its end. Hereby it is possible to position the intermediate element against the inlet opening of the flow channel and to seal it. According to the invention, the seal can have at least one sealing lip, but it is also possible that the seal is formed in the shape of an elastic sealing ring. Further, according to the invention, the seal can be embodied either in one piece with the intermediate element or in the form of a separate structural component which is connected, for example riveted, to the intermediate element. Here, it is also possible to use different materials for the seal and for the intermediate element itself.

In a particularly advantageous embodiment of the invention, it is provided that the intermediate element is made of a fire-resistant material. In this manner, a fabric can be inserted into the elastic material or can be attached on the same, for example.

According to the invention, the intermediate element can further be provided at its outer side with an additional seal element, which comes to rest in a sealing manner against an interior surface of the external housing. This seal element can be embodied so as to form one piece with the intermediate element, for example in the form of a ring-shaped circumferential sealing lip or a closed sealing profile, for example in a P-shape or a D-shape. However, it is also possible to insert a separate ring-shaped sealing element between the intermediate element and the external housing. In this manner, in particular a liquid seal is formed.

Just as with the flow channel, the intermediate element according to the invention can be embodied with different cross-sections, for example a circular, elliptical, rectangular one, or one of any other shape. In any case an aerodynamic shape of the interior element is formed during the manufacturing process of the intermediate element, wherein a sufficient thickness of the sealing bead can be provided at the inflow area of the intermediate element. In the mounted state, the intermediate element can be supported in the housing either through the elasticity of the individual seals, [or] it is also possible to glue it together with the interior area of the housing. The same applies to the transition between the intermediate element and the flow channel.

Thanks to the easy manufacturability of the intermediate element according to the invention, it is possible to provide different designs of seals, for example P-seals or D-seals, with or without hollow spaces. The seals can be provided with one or with multiple sealing lips. Further, it is possible to integrate separate sealing rings or sealing flanges or the like in the intermediate element.

The elasticity of the material of the intermediate element is sufficient to compensate for positional changes between the flow channel and the external housing. Here, the material of the intermediate element is not strained, or is strained only to a very low degree. The flow conditions do not change through the minor deformations of the intermediate element. This results in the air guide element according to the invention having a good level of efficiency.

In the following, the invention is described in connection to the drawing by referring to exemplary embodiments. Herein:

In the following exemplary embodiments, like parts are identified by the same reference numbers.

Figure 1:
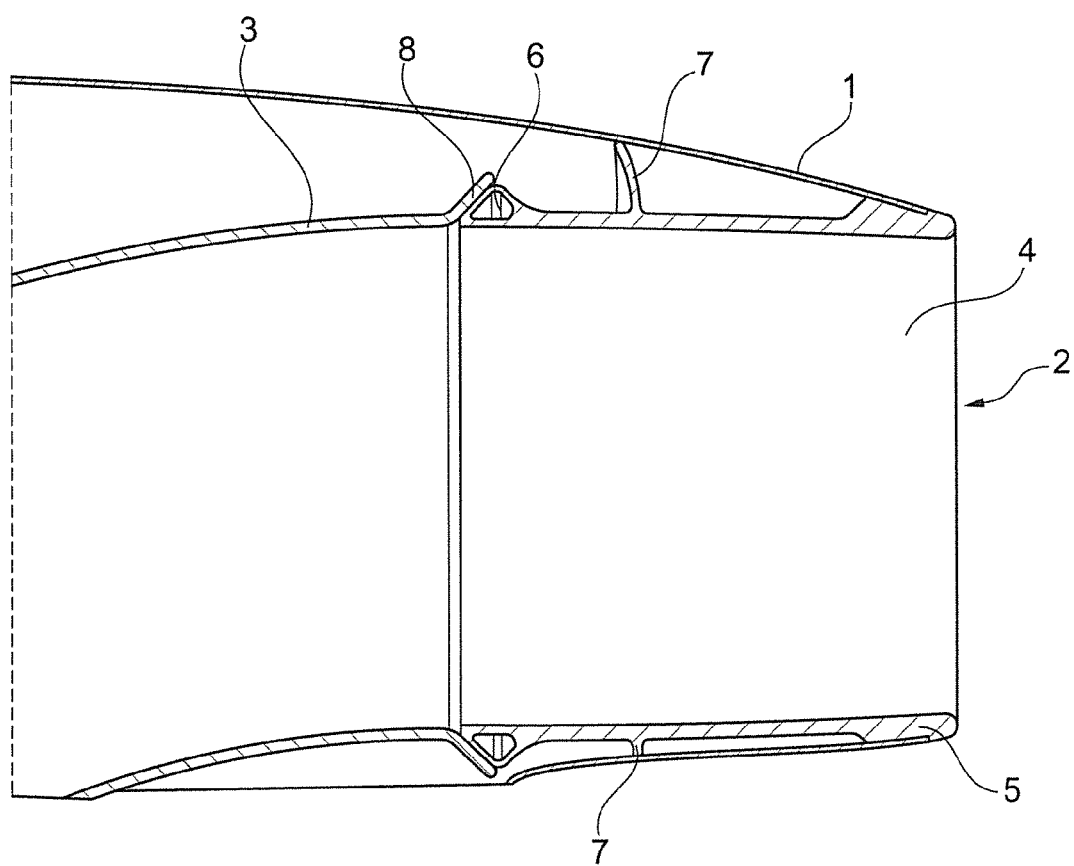
FIG. 1 shows a schematic sectional side view of a first exemplary embodiment.
Figure 5:
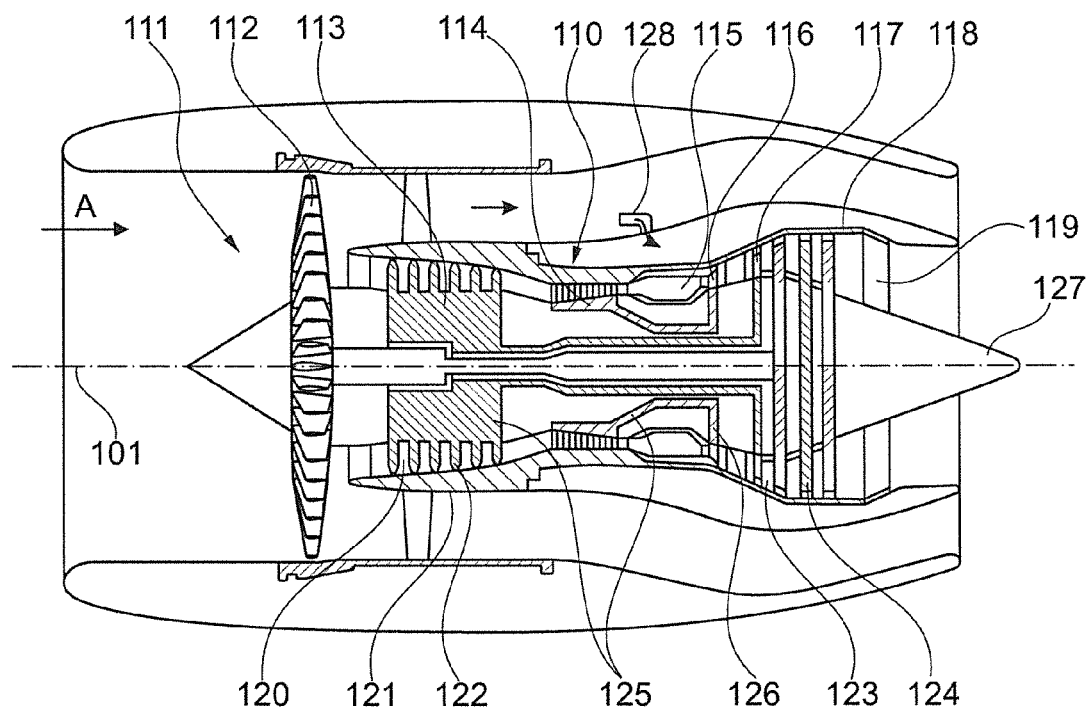
FIG. 5 shows a gas turbine engine for the use of the invention.

FIG. 1 shows a simplified sectional view of an air guide element 128 according to the invention (see FIG. 5). The basic design and the basic principle of operation are described in DE 10 2009 011 635 A1. This printed publication is referred to in its entirety.

The external housing 1 is made of a sheet material, for example of aluminum or titanium and/or glass-fiber-reinforced synthetic material or similar suitable materials. The external housing has an inflow opening 2 through which a flow, for example from a bypass channel, is introduced (according to the rendering in FIG. 1 from the right side). According to the invention, two, three or multiple air guide elements 128 including the associated piping can be provided.

According to the invention, a tubular intermediate element 4 made of an elastic material is provided. At the inflow area, the intermediate element 4 has a sealing bead 5, which comprises a reinforced cross-section and is fixedly connected to the edge area of the inflow opening 2 of the external housing 1, for example by being glued together or vulcanized.

The intermediate element 4 according to the invention extends across a part of the length of the external housing 1 and connects to a flow channel 3 that is embodied as a rigid tube, for example.

At the transition area, the flow channel 3 has a widening 8 which is embodied in a funnel-shaped manner. The end area of the intermediate element 4 abuts against this widening 8. A seal is provided in this area. In the exemplary embodiment of FIG. 1, it is realized as a circumferential, hollow sealing bead. It abuts against the widening and can also be connected to the same, for example by means of gluing.

In the middle area, the intermediate element 4 is provided with a seal element 7 that is formed in one piece with the same and is designed as a sealing lip and abuts against the inner side of the external housing 1.

Figure 2:
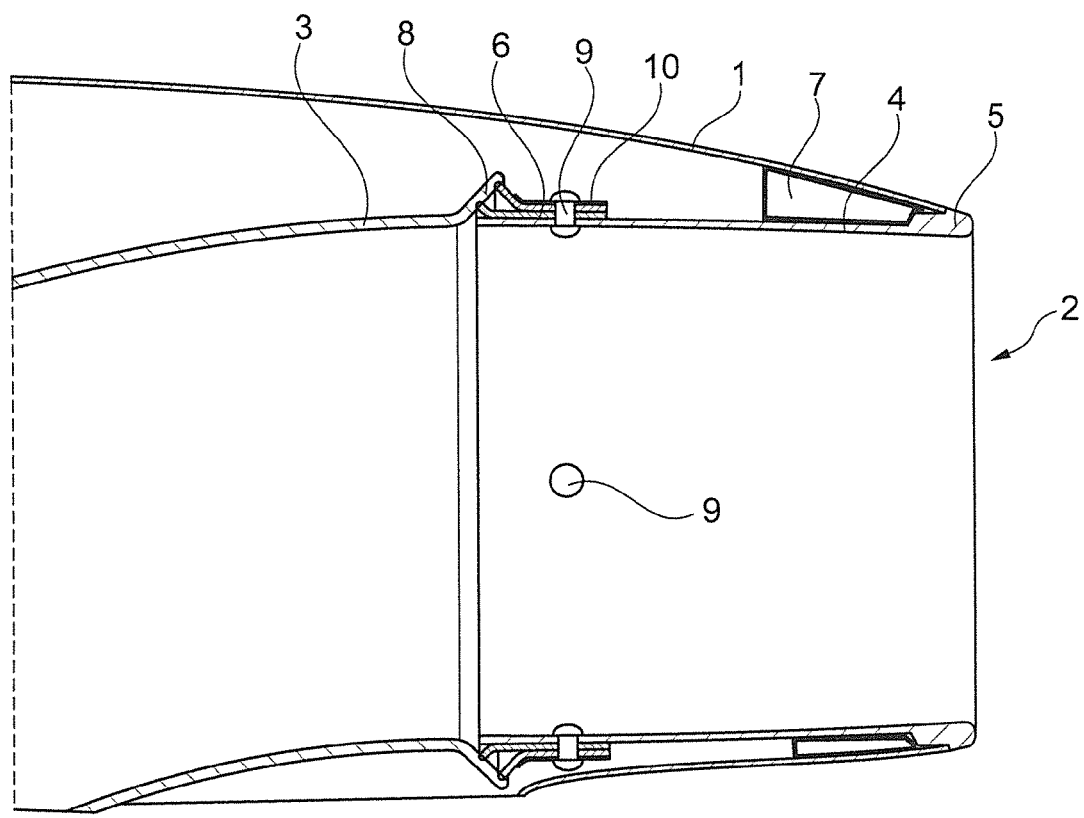
FIG. 2 shows a view, analogous to FIG. 1, of a modified exemplary embodiment.

In the exemplary embodiment of FIG. 2, the seal 6 is embodied as a separate O-ring seal, which is connected to the intermediate element 4 by means of a rivet 9. Here, an additional, second seal 6 can be inserted. In the shown exemplary embodiment the arrangement of seals 6 is supported by means of a ring 10.

In the middle area, the intermediate element has a ring-shaped sealing element 7 that can be embodied in a rigid or porous manner and that acts as a liquid seal.

Figure 3:
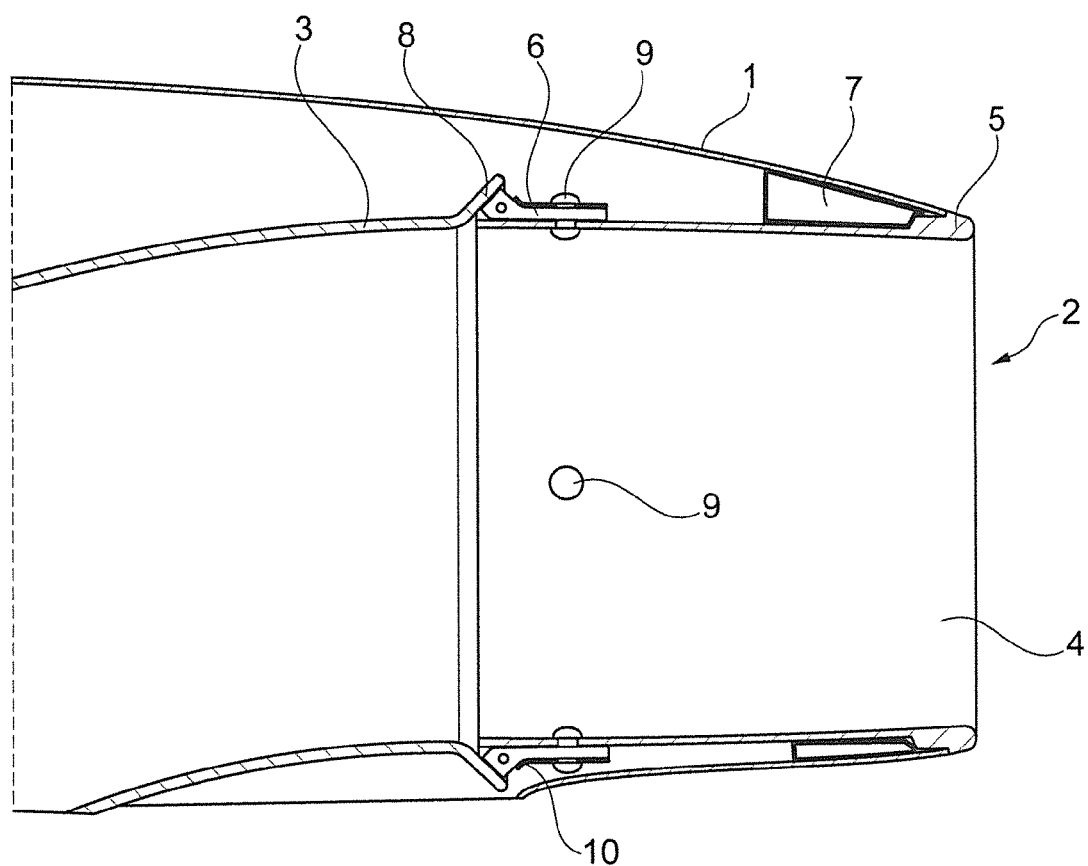
FIG. 3 shows another exemplary embodiment in a rendering analogous to FIG. 2.

When it comes to the design of the seal 6, the exemplary embodiment according to FIG. 3 differs from the exemplary embodiment of FIG. 2. While it, too, is riveted by means of a ring 10, it is provided with a thicker cross-section, resulting in a larger abutment surface at the widening 8 of the flow channel 3.

Figure 4:
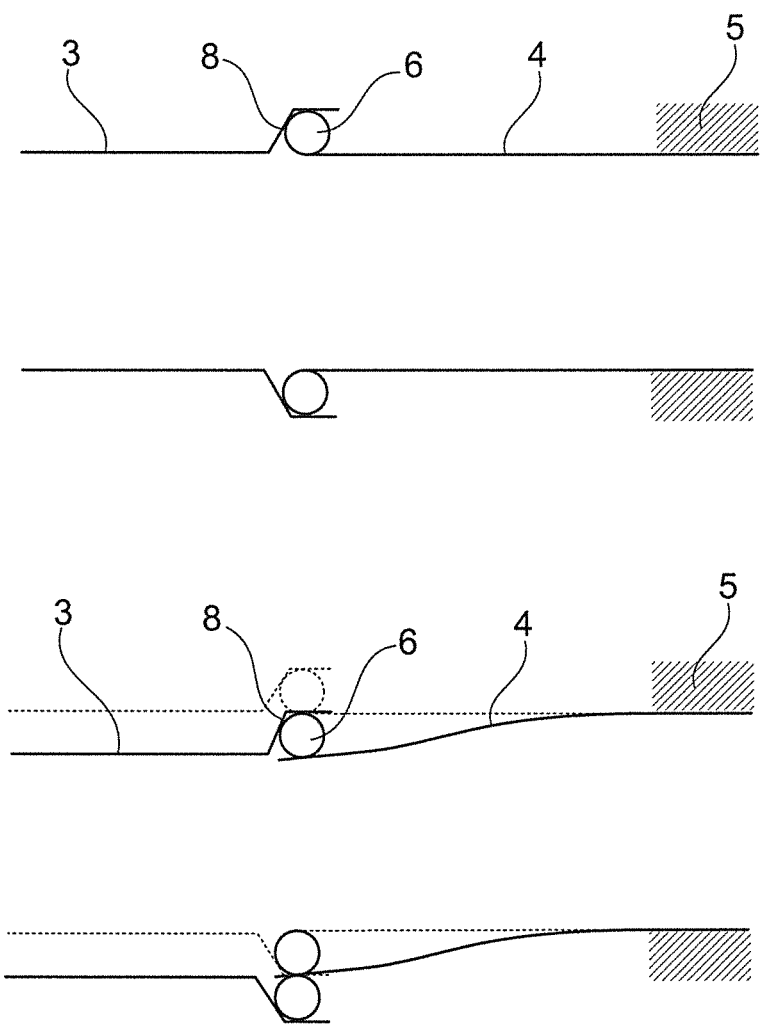
FIG. 4 shows a schematic view of the principle of operation of the intermediate element according to the invention.

FIG. 4 shows a schematic rendering of two operational conditions of the air guide element according to the invention in the mounted state. In the above rendering of FIG. 4, an exactly axially aligned arrangement is shown, in which the central axes of the intermediate element 4 and of the flow channel 3 (not shown) are aligned with each other. FIG. 4 shows an operational condition in which a minor radial displacement of the flow channel 3 is present. Thanks to the elasticity of the intermediate element 4 according to the invention, it is possible to compensate for this displacement without any flow loss and without compromising the sealing function of the seal 6. In the area of its sealing bead 5, the intermediate element 4 is mounted at the housing 1 which is not shown.

It follows from the exemplary embodiments described above that the intermediate element according to the invention can be mounted and dismounted in a simple manner. Furthermore, the use of an elastic rubber-like material of the intermediate element results in the avoidance of any direct material contact between the external housing 1 and the flow channel 3, for example any contact between aluminum and a composite structural component, or between titanium and another metallic structural component.

The gas turbine engine 110 according to FIG. 5 represents a general example of a turbomachine in which the invention can be used. The engine 110 is embodied in the conventional manner and comprises, arranged in succession in the flow direction, an air inlet 111, a fan 112 that is circulating inside a housing, a medium-pressure compressor 113, a high-pressure compressor 114, a combustion chamber 115, a high-pressure turbine 116, a medium-pressure turbine 117 and a low-pressure turbine 118, as well as an exhaust nozzle 119, which are all arranged around a central engine axis 101.

The medium-pressure compressor 113 and the high-pressure compressor 114 comprise multiple stages, respectively, with each of these stages having an array of fixedly attached stationary guide blades 120 extending in the circumferential direction, which are generally referred to as stator blades and which protrude radially inwards from the core engine housing 121 through the compressors 113, 114 into a ring-shaped flow channel. Further, the compressors have an array of compressor rotor blades 122 that protrude radially outwards from a rotatable drum or disc 125, [and] which are coupled to hubs 126 of the high-pressure turbine 116 or of the medium-pressure turbine 117.

The turbine sections 116, 117, 118 have similar stages, comprising an array of fixedly attached guide blades 123 which are protruding through the turbines 116, 117, 118 in a radially inward direction from the housing 121 into the ring-shaped flow channel, and a subsequent array of turbine blades 124 that are protruding externally from a rotatable hub 126. In operation, the compressor drum or compressor disc 125 and the blades 122 arranged thereon as well as the turbine rotor hub 126 and the turbine rotor blades 124 arranged thereon rotate around the engine axis 101.

FIG. 5 shows the arrangement of the air guide element 128 according to the invention.

PARTS LIST 1 external housing
2 inflow opening
3 flow channel
4 intermediate element
5 sealing bead
6 seal
7 sealing element
8 widening
9 rivet
10 ring
101 engine middle axis
110 gas turbine engine/core engine
111 air inlet
112 fan
113 medium-pressure compressor (compactor)
114 high-pressure compressor
115 combustion chamber
116 high-pressure turbine
117 medium-pressure turbine
118 low-pressure turbine
119 exhaust nozzle
120 guide blades
121 core engine housing
122 compressor rotor blades
123 guide blades
124 turbine blades
125 compressor drum or disc
126 turbine rotor hub
127 outlet cone
128 air guide element

The invention claimed is:

1. A fully integrated air guide element of an aircraft gas turbine, comprising:
    an external housing that is provided with an inflow opening,
    a flow channel arranged inside the external housing,
    a tubular intermediate element made of an elastic material arranged inside the inflow opening, connecting the inflow opening to the flow channel in a sealing and position-adjusting manner;
    wherein, the tubular intermediate element includes at a front area thereof in a flow direction, a ring-shaped sealing bead;
    wherein the ring-shaped sealing bead is fixedly attached to a front edge area of the external housing;
    a ring-shaped seal arranged at a back end area of the tubular intermediate element that abuts against a widening of the flow channel; and
    wherein the ring-shaped seal comprises at least one sealing lip.

2. The fully integrated air guide element according to claim 1, wherein the ring-shaped seal is embodied in one piece with the tubular intermediate element.

3. The fully integrated air guide element according to claim 1, and further comprising a sealing element abutting against an inner side of the housing, adjoining the ring-shaped sealing bead at an outer side of the tubular intermediate element.

4. The fully integrated air guide element according to claim 3, wherein the sealing element is embodied as one piece with the tubular intermediate element.

5. The fully integrated air guide element according to claim 3, wherein the sealing element is embodied as a separate structural component from the tubular intermediate element.

6. The fully integrated air guide element according to claim 3, wherein the tubular intermediate element is made of a fire-resistant material.

7. The fully integrated air guide element according to claim 1, wherein the ring-shaped seal is a separate structural component from the tubular intermediate element.

8. The fully integrated air guide element according to claim 7, and further comprising a sealing element abutting against an inner side of the housing, adjoining the ring-shaped sealing bead at an outer side of the tubular intermediate element.

9. The fully integrated air guide element according to claim 8, wherein the sealing element is embodied as one piece with the tubular intermediate element.

10. The fully integrated air guide element according to claim 8, wherein the sealing element is embodied as a separate structural component from the tubular intermediate element.

11. The fully integrated air guide element according to claim 8, wherein the tubular intermediate element is made of a fire-resistant material.

12. The fully integrated air guide element according to claim 1, and further comprising a sealing element abutting against an inner side of the housing, adjoining the ring-shaped sealing bead at an outer side of the tubular intermediate element.

13. The fully integrated air guide element according to claim 12, wherein the sealing element is embodied as one piece with the tubular intermediate element.

14. The fully integrated air guide element according to claim 12, wherein the sealing element is embodied as a separate structural component from the tubular intermediate element.

15. The fully integrated air guide element according to claim 12, wherein the tubular intermediate element is made of a fire-resistant material.

16. The fully integrated air guide element according to claim 1, wherein the tubular intermediate element is made of a fire-resistant material.

* * * * *